(12) United States Patent
Lyubarsky et al.

(10) Patent No.: US 10,230,928 B2
(45) Date of Patent: Mar. 12, 2019

(54) COLOR RECAPTURE USING POLARIZATION RECOVERY IN A COLOR-FIELD SEQUENTIAL DISPLAY SYSTEM

(71) Applicant: Texas Instruments Incorporated, Dallas, TX (US)

(72) Inventors: Alexander Lyubarsky, Dallas, TX (US); Gregory Scott Pettitt, Farmersville, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/921,438

(22) Filed: Oct. 23, 2015

(65) Prior Publication Data

US 2016/0119595 A1 Apr. 28, 2016

Related U.S. Application Data

(60) Provisional application No. 62/068,908, filed on Oct. 27, 2014.

(51) Int. Cl.
*H04N 9/31* (2006.01)
*G02B 26/00* (2006.01)
(Continued)

(52) U.S. Cl.
CPC ......... *H04N 9/3117* (2013.01); *G02B 26/008* (2013.01); *G02B 27/0961* (2013.01); *G02B 27/145* (2013.01); *G02B 27/26* (2013.01); *G02B 27/283* (2013.01); *G02B 27/286* (2013.01); *G03B 21/008* (2013.01); *G03B 21/206* (2013.01); *G03B 21/2066* (2013.01);
(Continued)

(58) Field of Classification Search
CPC .. H04N 9/3105; H04N 9/3111; H04N 9/3114; H04N 9/3117; H04N 9/3158; H04N 9/3167; G03B 21/204; G03B 21/2073; G02B 27/26; G02B 27/283
See application file for complete search history.

(56) References Cited

U.S. PATENT DOCUMENTS 3,001,447 A 9/1961 Ploke
3,746,911 A 7/1973 Nathanson
(Continued)

FOREIGN PATENT DOCUMENTS

JP H11264953 9/1999

*Primary Examiner* — Bao-Luan Q Le
(74) *Attorney, Agent, or Firm* — Michael A. Davis, Jr.; Charles A. Brill; Frank D. Cimino

(57) ABSTRACT

An image may be formed in a projection system by forming a light beam with substantially a first polarization. The light beam is directed onto a first color wheel that transmits a first selected color portion of the light beam and reflects a second color portion of the light beam. The reflected second color portion is converted to a second polarization. A first portion of the image is produced with a first spatial light modulator using the first selected color portion of the light beam having the first polarization. A second portion of the image is produced with a second spatial light modulator using at least a portion of the reflected second color portion of the light beam having the second polarization. The first portion of the image and the second portion of the image are combined to form a combined image for projection.

24 Claims, 11 Drawing Sheets

(51) Int. Cl.
*G02B 27/14* (2006.01)
*G02B 27/28* (2006.01)
*H04N 13/337* (2018.01)
*G02B 27/26* (2006.01)
*G02B 27/09* (2006.01)
*G03B 21/00* (2006.01)
*G03B 21/20* (2006.01)
*G03B 33/08* (2006.01)
*G02B 26/08* (2006.01)
*G03B 35/22* (2006.01)
*G03B 37/04* (2006.01)

(52) U.S. Cl.
CPC ......... *G03B 21/2073* (2013.01); *G03B 33/08* (2013.01); *H04N 9/3105* (2013.01); *H04N 9/3111* (2013.01); *H04N 9/3114* (2013.01); *H04N 9/3158* (2013.01); *H04N 9/3167* (2013.01); *H04N 13/337* (2018.05); *G02B 26/0833* (2013.01); *G02B 27/0994* (2013.01); *G02B 27/141* (2013.01); *G03B 35/22* (2013.01); *G03B 37/04* (2013.01)

(56) References Cited

U.S. PATENT DOCUMENTS

| | | | | |
|---|---|---|---|---|
| 3,886,310 | A | 5/1975 | Guldberg | |
| 3,972,040 | A | 7/1976 | Hilsum | |
| 4,036,553 | A | 7/1977 | Borel et al. | |
| 4,087,810 | A | 5/1978 | Hung | |
| 4,151,549 | A | 4/1979 | Bautze | |
| 4,337,759 | A | 7/1982 | Popovich et al. | |
| 4,403,248 | A | 9/1983 | Tel Velde | |
| 4,430,648 | A | 4/1984 | Togashi | |
| 4,441,791 | A | 4/1984 | Hornbeck | |
| 4,638,309 | A | 1/1987 | Ott | |
| 4,680,579 | A | 7/1987 | Ott | |
| 4,854,669 | A | 8/1989 | Birnbach | |
| 4,879,602 | A | 11/1989 | Glenn | |
| 4,969,730 | A | 11/1990 | Van Den Brandt | |
| 5,061,049 | A | 10/1991 | Hornbeck | |
| 5,079,544 | A | 1/1992 | De Mond | |
| 5,083,857 | A | 1/1992 | Hornbeck | |
| 5,096,279 | A | 3/1992 | Hornbeck | |
| 5,101,236 | A | 3/1992 | Nelson | |
| 5,172,161 | A | 12/1992 | Nelson | |
| 5,212,555 | A | 5/1993 | Stoltz | |
| 5,339,116 | A | 8/1994 | Urbanus | |
| 5,386,250 | A | 1/1995 | Guerinot | |
| 5,387,929 | A | 2/1995 | Collier | |
| 5,428,408 | A | 6/1995 | Stanton | |
| 5,612,753 | A * | 3/1997 | Poradish | H04N 9/3108 348/743 |
| 5,863,125 | A * | 1/1999 | Doany | G02B 26/008 348/743 |
| 5,905,545 | A * | 5/1999 | Poradish | H04N 9/3108 348/743 |
| 5,921,650 | A * | 7/1999 | Doany | G02B 26/008 348/743 |
| 6,188,520 | B1 | 2/2001 | Huang | |
| 6,208,451 | B1 | 3/2001 | Itoh | |
| 6,457,833 | B1 * | 10/2002 | Ishikawa | H04N 9/3114 348/743 |
| 6,561,653 | B2 * | 5/2003 | Belliveau | F21S 10/00 348/740 |
| 6,927,910 | B2 | 8/2005 | Kang | |
| 6,962,414 | B2 * | 11/2005 | Roth | H04N 9/3114 348/E9.027 |
| 7,077,524 | B2 * | 7/2006 | Roth | H04N 9/3114 348/57 |
| 7,347,562 | B2 * | 3/2008 | Greenberg | G02B 26/008 348/E9.027 |
| 7,570,410 | B2 * | 8/2009 | Pettitt | G03B 33/06 359/237 |
| 7,794,092 | B2 * | 9/2010 | Drazic | H04N 9/3147 348/743 |
| 8,922,722 | B2 * | 12/2014 | Huang | H04N 13/0418 349/13 |
| 2004/0184005 | A1 * | 9/2004 | Roth | H04N 9/3114 353/20 |
| 2005/0259225 | A1 * | 11/2005 | Greenberg | G02B 26/008 353/31 |
| 2005/0275806 | A1 * | 12/2005 | Roth | H04N 9/3114 353/20 |
| 2006/0290889 | A1 * | 12/2006 | Robinson | G02B 27/26 353/8 |
| 2007/0102637 | A1 | 5/2007 | Chen et al. | |
| 2007/0195275 | A1 * | 8/2007 | Drazic | H04N 9/3147 353/30 |
| 2008/0158516 | A1 * | 7/2008 | Pettitt | G03B 33/06 353/34 |
| 2012/0002173 | A1 * | 1/2012 | Akiyama | G03B 21/2013 353/30 |
| 2013/0321718 | A1 * | 12/2013 | Huang | H04N 13/0418 349/5 |

* cited by examiner

COLOR RECAPTURE USING POLARIZATION RECOVERY IN A COLOR-FIELD SEQUENTIAL DISPLAY SYSTEM

CLAIM OF PRIORITY UNDER 35 U.S.C. 119(E)

The present application claims priority to and incorporates by reference U.S. Provisional Application No. 62/068,908, filed Oct. 27, 2014, entitled "COLOR RECAPTURE USING POLARIZATION RECOVERY IN A COLOR-FIELD SEQUENTIAL DISPLAY SYSTEM."

BACKGROUND OF THE INVENTION

Field of the Invention

Embodiments of the present invention generally relate to improving light efficiency in a color projection system.

Description of the Related Art

Color-field sequential display systems such as a DLP projector often require a color wheel in order to sequentially display red, green, and blue light onto a modulation panel. At any moment in time, the modulation panel is seeing a single color. The color wheel filters the white light from a light source, such as a lamp, into Red, Green, and Blue as it rotates. At any moment in time, only approximately one third of the light is transmitted through the system and the rest is reflected and unused. Thus, the system is not very efficient in the use of light energy.

BRIEF DESCRIPTION OF THE DRAWINGS

Particular embodiments in accordance with the invention will now be described, by way of example only, and with reference to the accompanying drawings.

Figure 1:
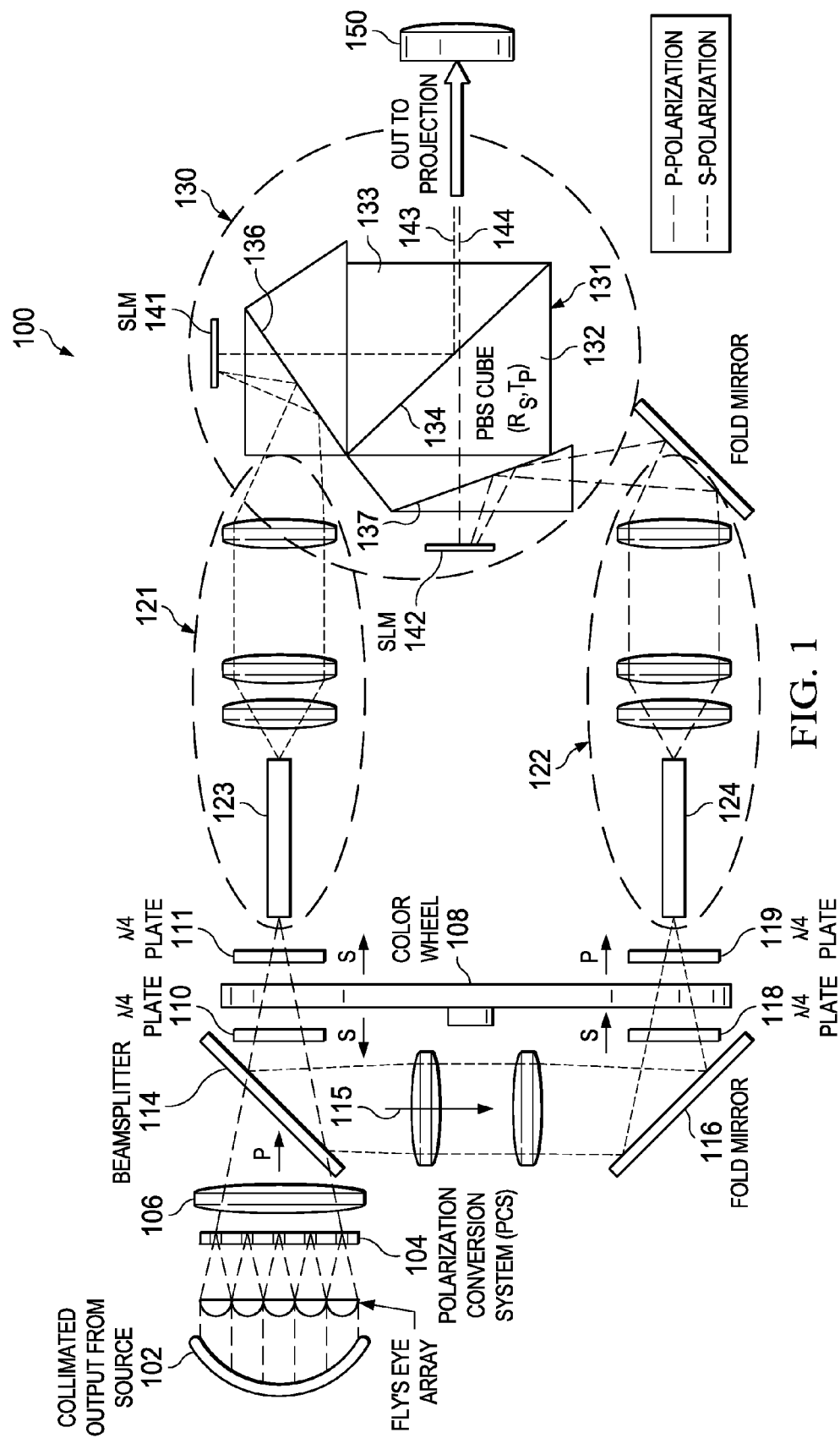
FIG. 1 is a schematic of an example projector that has two paths for differently polarized light beams that enable recapture of reflected light.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Embodiments of this invention provide a solution to the problem of recapturing unused light from a source that is filtered by a color wheel in a color-field sequential display system such as a DLP™ projector. A high brightness display system employing a color wheel and multiple spatial light modulators is disclosed herein. Since two-thirds of the light from a light source is filtered out by the color wheel, a solution is to recapture that 'unused' light and let it enter the system at a different location, incident onto another modulation panel. This solution is considered a 'two-chip' solution with many advantages that will be described in more detail below. The display system uses both the transmitted and the reflected light from the color wheel in producing images. Specifically, the transmitted and reflected light components are sent to separate spatial light modulators and modulated separately.

Polarization is a property of waves that can oscillate with more than one orientation. Electromagnetic waves such as light exhibit polarization, as do some other types of wave, such as gravitational waves. In an electromagnetic wave, both the electric field and magnetic field are oscillating but in different directions; by convention the "polarization" of light refers to the polarization of the electric field. Light which can be approximated as a plane wave in free space or in an isotropic medium propagates as a transverse wave—both the electric and magnetic fields are perpendicular to the wave's direction of travel. The oscillation of these fields may be in a single direction (linear polarization), or the field may rotate at the optical frequency (circular or elliptical polarization). For linear polarization, the plane made by the propagation direction and a vector perpendicular to the plane of a reflecting surface may be used as a coordinate system. This is known as the "plane of incidence". The component of the electric field parallel to this plane is termed "p-like" (parallel) and the component perpendicular to this plane is termed "s-like" (from senkrecht, German for perpendicular). Polarized light with its electric field along the plane of incidence is thus denoted p-polarized; while light whose electric field is normal to the plane of incidence is called s-polarized.

As is well known, polarization effects may occur at a reflective interface between two materials of different refractive index. These effects are treated by the Fresnel equations. Part of the wave is transmitted and part is reflected. For a given material, these proportions and the phase of reflection are dependent on the angle of incidence and are different for the s and p polarizations. Any light striking a surface at a special angle of incidence known as Brewster's angle, where the reflection coefficient for p polarization is zero, will be reflected with only the p-polarization remaining. For example, a stack of plates at Brewster's angle to a beam reflects off a fraction of the s-polarized light at each surface, leaving a mainly p-polarized beam to pass through the stack.

A display system that separates reflected and transmitted light from a color wheel of the display system; and modulates the separated reflected and transmitted light components using separate spatial light modulators is described in U.S. Pat. No. 7,570,410, Gregory S, Pettit, Aug. 4, 2009, and is incorporated by reference herein. The reflected and transmitted light beams are recombined into a single optical path, and then re-divided and provided to the separate spatial light modulators.

FIG. 1 is a schematic of an example projector 100 that has two separate optical paths for differently polarized light beams that enable capture of reflected light. Display system 100 includes light source 102, polarization unit 104, condensing lens 106, color wheel 108, polarization rotators 110, 111 that are each quarter-wave plates capable of rotating polarization by 90°, beam splitter 114, fold mirror 116, polarization rotators 118, 119 that are each quarter-wave plates capable of rotating polarization by 90°, illumination relays 121 and 122 which include integrator 123 and 124 that homogenize the light, total internal reflection (TIR) prisms 136 and 137, spatial light modulators (SLM) 141 and 142, a polarized beam splitter (PBS) cube 131 used to recombine the two separate optical paths having different polarizations and projection optics 150. Additional light tubes and lenses may be used to direct each light beam to its destination.

Light source 102, such as an arc lamp or other source of white light, provides illumination light that is composed of s and p polarization components in random order. Polarization unit 104 transforms one of the two components, such as p (or s) as much as possible into the other component, such as s (or p) component. The light is directed to color wheel 108 through condensing lens 106.

The polarization conversion system (PCS) 104 may be any suitable device, such as those described in U.S. Pat. Nos. 6,927,910 and 6,208,451, the subject matter of each being incorporated herein by reference in entirety. Typically, PCS 104 is an array of polarized beamsplitter cubes with a "fly eye" lens oriented to direct focused light beams onto each of the array of beamsplitter cubes. A half-wave plate is typically placed at the output of every other polarized beamsplitter cube such that transmitted light will be converted to the same polarization as the reflected light of the polarized beamsplitter cube. PCS 104 is typically a half-wave plate that receives a beam of radiation of any arbitrary polarization direction (angle) and produces a new radiation beam, coaxial with the incident radiation but with a specified new polarization direction (angle). In this example, assume the light beam emerges from PCS 104 with P polarization. However, in another embodiment S polarization may be used with suitable adjustments to the downstream light paths, for example.

Figure 2:
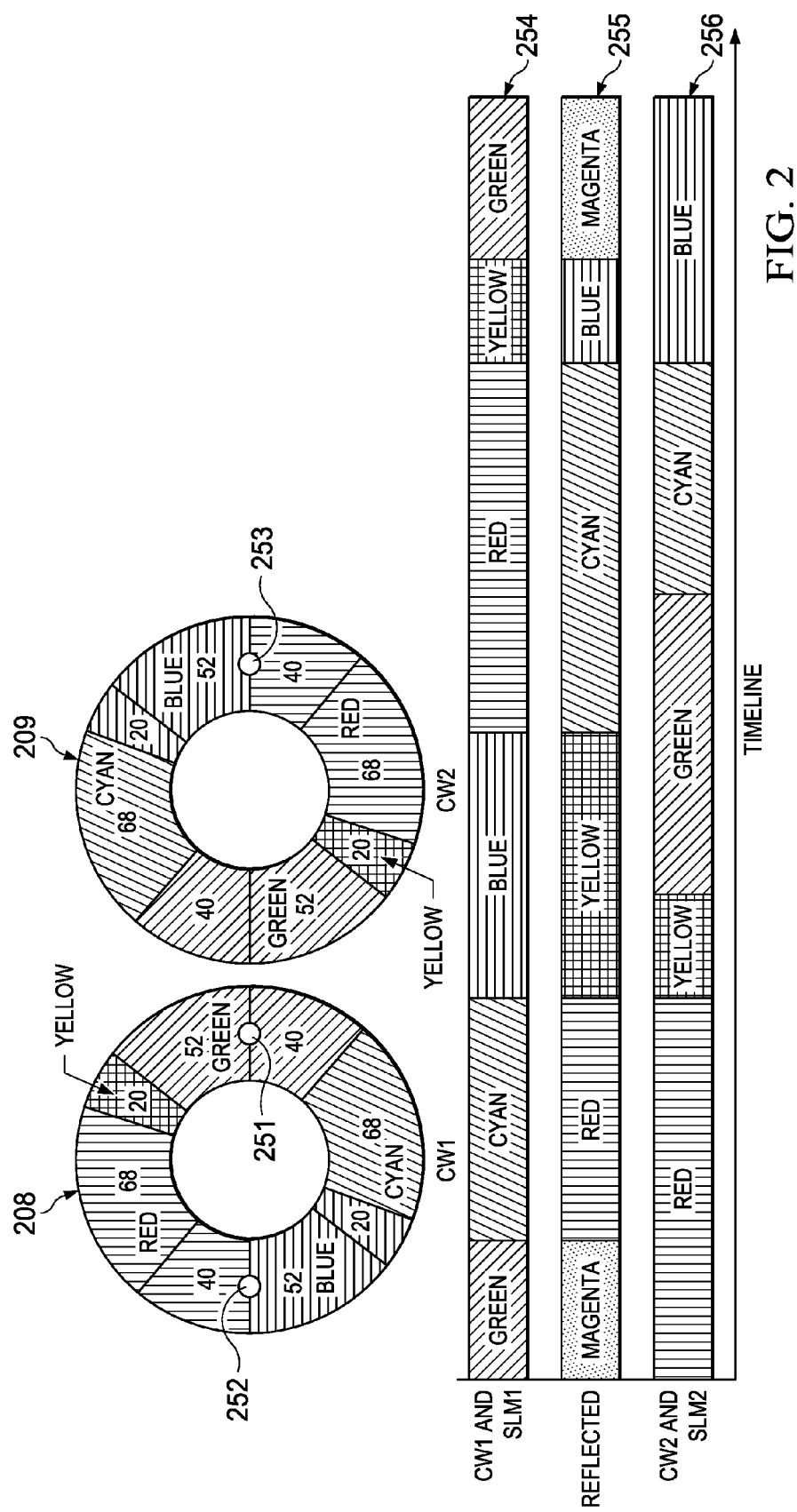
FIG. 2 illustrates an exemplary pair of color wheels for use in the example projectors illustrated in FIGS. 1 and 3-8.

Beam splitter 114 may be a PBS cube. The linearly polarized light beam from PCS 104 has a P polarization and passes straight through PBS 114 and is directed onto color wheel 108. Color wheel 108 includes a set of primary color filters, such as red, green, and blue as shown in FIG. 2. Alternatively, the color wheel may have other color components, such as cyan, magenta, and yellow. In other examples, the color wheel may have other combinations of colors, selected from red, green, blue, cyan, magenta, yellow, and other colors; and the colors may be arranged in the color wheel in any desired orders.

Referring again to FIG. 1, color wheel 108 is configured to transmit a majority (e.g. 90% or more) of the incident light for a selected color portion corresponding to the position of the color wheel. The remainder of the light beam is reflected away from the color wheel and forms a reflected color portion. In this example, the P polarized light transmits through beamsplitter 114 and an achromatic quarter wave plate 110, rotating polarization 90°. Transmitted wavelengths (primary colors, RGB) by the color wheel transmit through another quarter wave plate 111 for a total of 180° rotation to produce an s polarized beam of the color selected by the color wheel. This light then enters solid integrator rod 123 which homogenizes the light to create a uniform intermediate image of the light source (and continues through first illumination path 121 on its way to a first display modulator panel 141. Reflected or rejected wavelengths (secondary colors, CYM) from the color wheel transmit back through same quarter wave plate 110 such that they become polarized and are now reflected by beamsplitter 114. In this example, the reflected from light wheel 108 transmits through quarter wave plate 110 linearly polarizing the light 180° to s-pol from the incident p-pol light. This light enters the polarization splitting prism 114 via a side surface that is parallel to the system optical axis and falls incident on a polarization splitting film. S polarized light incident on the polarization splitting film is reflected out through a side surface as indicated at 115.

The operation of wave plates is well known. A typical wave plate may be constructed by aligning the fast axis of a birefringent quartz plate with the slow axis of another birefringent plate made from magnesium fluoride or UV sapphire, for example. This combination may be configured to result in a relative phase delay of $\lambda/4$ or $\lambda/2$ between the two axes, for example.

A relay that includes mirror 116 and associated lenses may be used to image the reflected beam 115 onto a second spot on color wheel 108 or onto a different color wheel. This light is now transmitted along a second illumination path 122 that includes integrator 124 on its way to second display modulation panel 142 Passing the reflected beam 115 through a different color sector of color wheel 108 may be used for additional filtering to improve color performance. The same color wheel 108 may be used as illustrated in FIG. 1, or a second color wheel may be used as illustrated in later figures.

In this example, reflected beam 115 is passed through a quarter wave plate 118, rotating polarization 90° and then through another quarter wave plate 119 rotating the polarization another 90° thus totaling 180° polarization rotation to produce a p polarized beam of the colors reflected by color wheel 108, less any portion of the reflected wave that is reflected by the second pass through the color wheel.

Optical assembly 130 includes PBS cube 131, spatial light modulators 141, 142, and reflective surfaces 136, 137, such as a total internal reflection (TIR) surface, for directing the s and p components onto separate spatial light modulators 141 and 142 by transmission and reflection. Since the two illumination paths are of different polarizations, the two paths can be recombined in the projection path after the panels using polarized beamsplitter cube 131. Light from the first modulation panel is transmitted, while light from the second modulation panel is reflected, or vice versa.

In the particular example as shown in the figure, the s component is directed to spatial light modulator 141 and the p component is directed to spatial light modulator 142. The spatial light modulators then respectively modulate the s and p component light so as to form different color portions of the desired image. The two modulated light beams from the two spatial light modulators are directed to projection PBS cube 131 that includes two prisms 132, 133 with a polarization coating 134 on the hypotenuse of the prisms. The p polarized light beam from spatial light modulator 142 is transmitted directly through PBS cube 131 as indicated at 144, while the s polarized light beam from spatial modulator 141 is reflected by polarization layer 134 as indicated at 143.

In this manner, the modulated s polarized light beam that forms an image for the color portion selected by color wheel 108 and the modulated reflected light beam that is p polarized forms an image corresponding to a secondary color portion of the light beam provided by light source 102 are combined into a single modulated light beam that may then be directed to projection lens 150 for projection onto a screen or other viewing surface. To give an example of the color in each path, assume Red is transmitted through illumination path 121. Green and blue is rejected by the filter wheel; this forms a secondary color known as Cyan. Cyan is transmitted along illumination path 122 at a different polarization which will be recombined in the projection path. A similar process occurs when Blue is selected for path 121 and the red/green or yellow portion is reflected and when Green is selected for path 121 while the red/blue or magenta portion is reflected.

Spatial light modulators 141, 142 in the above example may be digital micromirror devices comprising an array of individually addressable micromirrors, though the two spatial light modulators may or may not have the same configuration. For example, the micromirror arrays of the two spatial light modulators may have different resolutions with the resolution being defined as the total number of micromirrors in the array used in modulating the incident light. In another example, each or both of the spatial light modulators may be spatial light modulators of other suitable pixels, such as liquid-crystal cells, liquid-crystal-on-silicon cells, and other suitable devices.

In the above example, it can be seen that the color wheel reflects and transmits the incident illumination light. The transmitted and reflected light portions after the color wheel are delivered to separate spatial light modulators for modulation. Both illumination paths are of opposite polarizations and are recombined using a polarized beam splitter cube in the projection path. Because the transmitted and reflected light portions can have different color combinations, the desired color of the projected image on the screen can be achieved. The above light recapture process is superior over those existing light recapture processes using polarization beam splitters in the same field, wherein a polarization beam splitter simply rejects one of the polarizations resulting in a loss of light. Embodiments of the invention may thus provide a higher efficiency projector. A majority of light is recaptured from the light source providing high lumen output. Reflected light from the color wheel may be reused to illuminate a second modulation panel and thereby achieve higher color ratios.

Projector 100 is essentially two projectors, using a single lamp and a single projection lens. Approximately half of the light energy is applied to each modulation panel 141, 142 which results in half the thermal load on each panel. This may result in a simpler cooling mechanism.

FIG. 2 illustrates an exemplary pair of color wheels 208, 209. As discussed with regard to FIG. 1, a single color wheel such as 208 may be used. In other embodiments, two color wheels may be use, as will be described with regard to FIGS. 3, 6, and 7, for example. The construction of color wheels is well known. A color wheel is divided into several segments in which each segment passes a particular band of light frequency and reflects the remaining light frequencies. Typically, a color includes a set of primary color filters, such as red, green, and blue. Alternatively, the color wheel may have other color components, such as cyan, magenta, and yellow. In other examples, the color wheel may have other combinations of colors, selected from red, green, blue, cyan, magenta, yellow, and other colors; and the colors may be arranged in the color wheel in any desired order.

The numbers in the filter segments of color wheels 208, 209 refer to the angular size of the segment. Obviously, the size of all of the segments together is 360 degrees. The size of the various color segments may be adjusted to suit a particular system or application to achieve a desired color performance.

Referring again to FIG. 1, the first light path 121 receives light filtered by one side of color wheel 108, while second light path 122 receives light filtered by the opposite side of color wheel 108. Referring now to FIG. 2, this may be visualized by assuming light path 121 is positioned around location 251 of color wheel 208, and light path 122 is positioned around location 252 of color wheel 208. Assuming the color wheel spins in counter-clockwise direction, a sequence of colored light illustrated by sequence 254 will be provided to first light path 121.

As described above in more detail, a portion of the source light will be reflected, such as sequence 255. By passing the reflected light beam through the opposite side of color wheel 208, a filtered version of the reflected light may be provided to light path 122 as illustrated by sequence 256.

In this manner, both spatial light modulators 141, 142 may see the same sequence of light, but offset by 180 degrees. Alternatively, in some embodiments an unfiltered reflected sequence such sequence 255 may be provided to the second spatial light modulator.

Digital processing logic that is controlling spatial modulators 141, 142 will be configured to provide image information the spatial light modulators corresponding to the color sequence that is provided.

Figure 3:
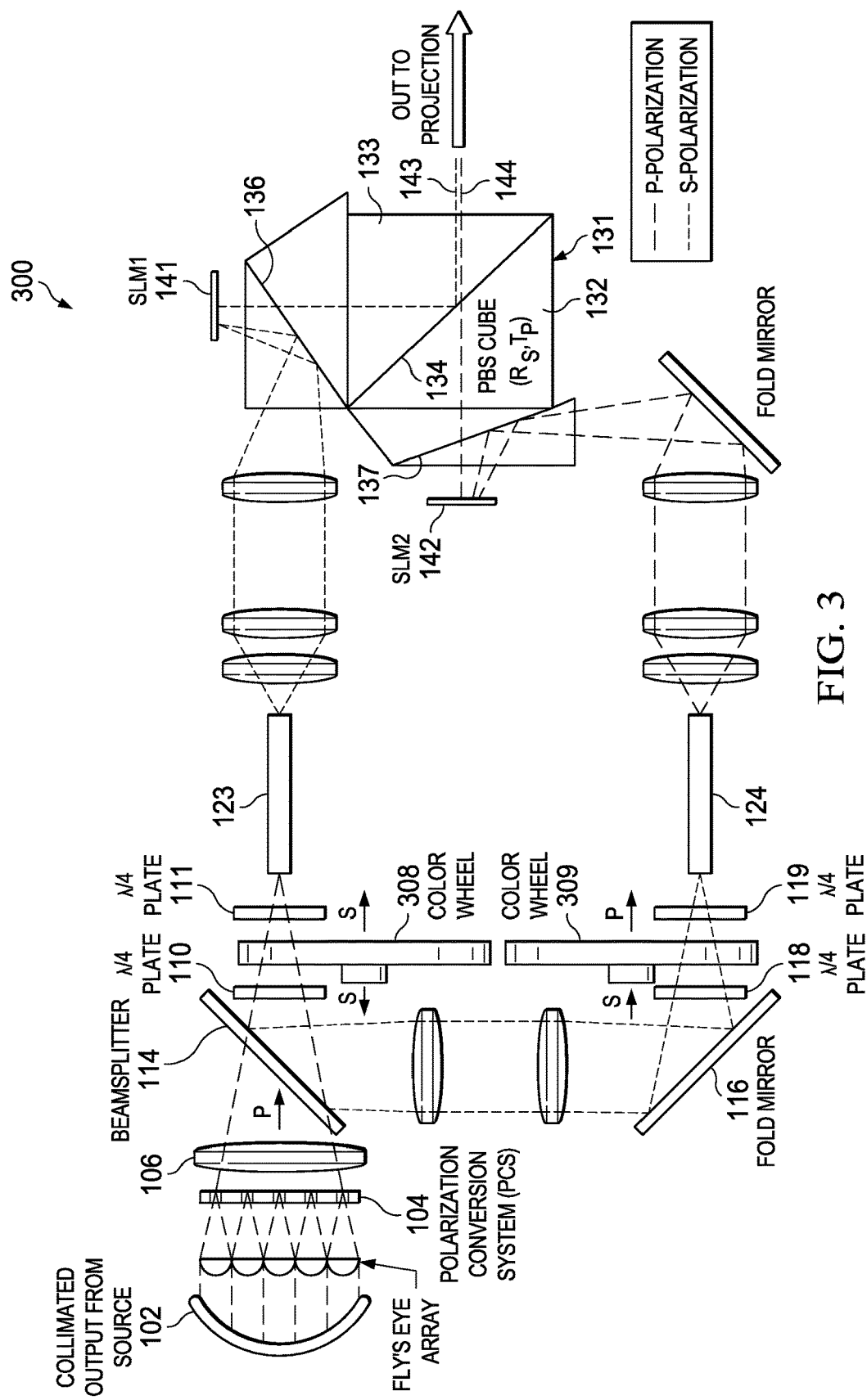
FIGS. 3-8 are schematics of various configurations of mirrors and color wheels that may be used to create two paths for differently polarized light beams in various example image projectors.

FIGS. 3-8 are schematics of various configurations of mirrors and color wheels that may be used to create two paths for differently polarized light beams in other example image projectors. For example, in FIG. 3 illustrates an example projector 300 that includes two color wheels 308, 309 that may be constructed similar to color wheels 208, 209. Otherwise, the projector 300 operates similarly to projector 100.

Figure 4:
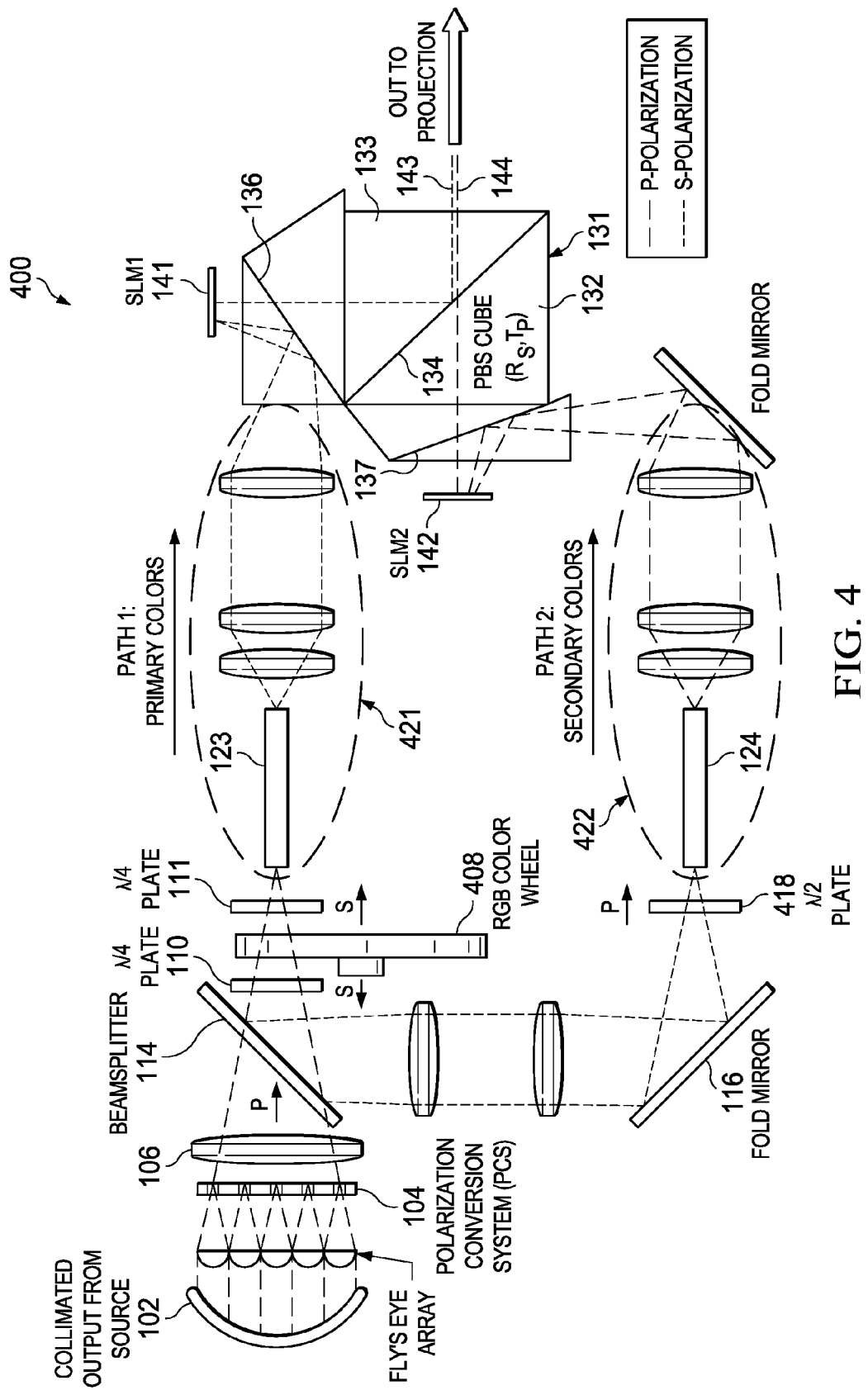

FIG. 4 illustrates an example projector 400 that uses a color wheel 408 only in the first light path 421. In this case, the reflected light provided to light path 422 is not further filtered. In this example, a single half wave plate 418 is used in the second light path.

Figure 5:
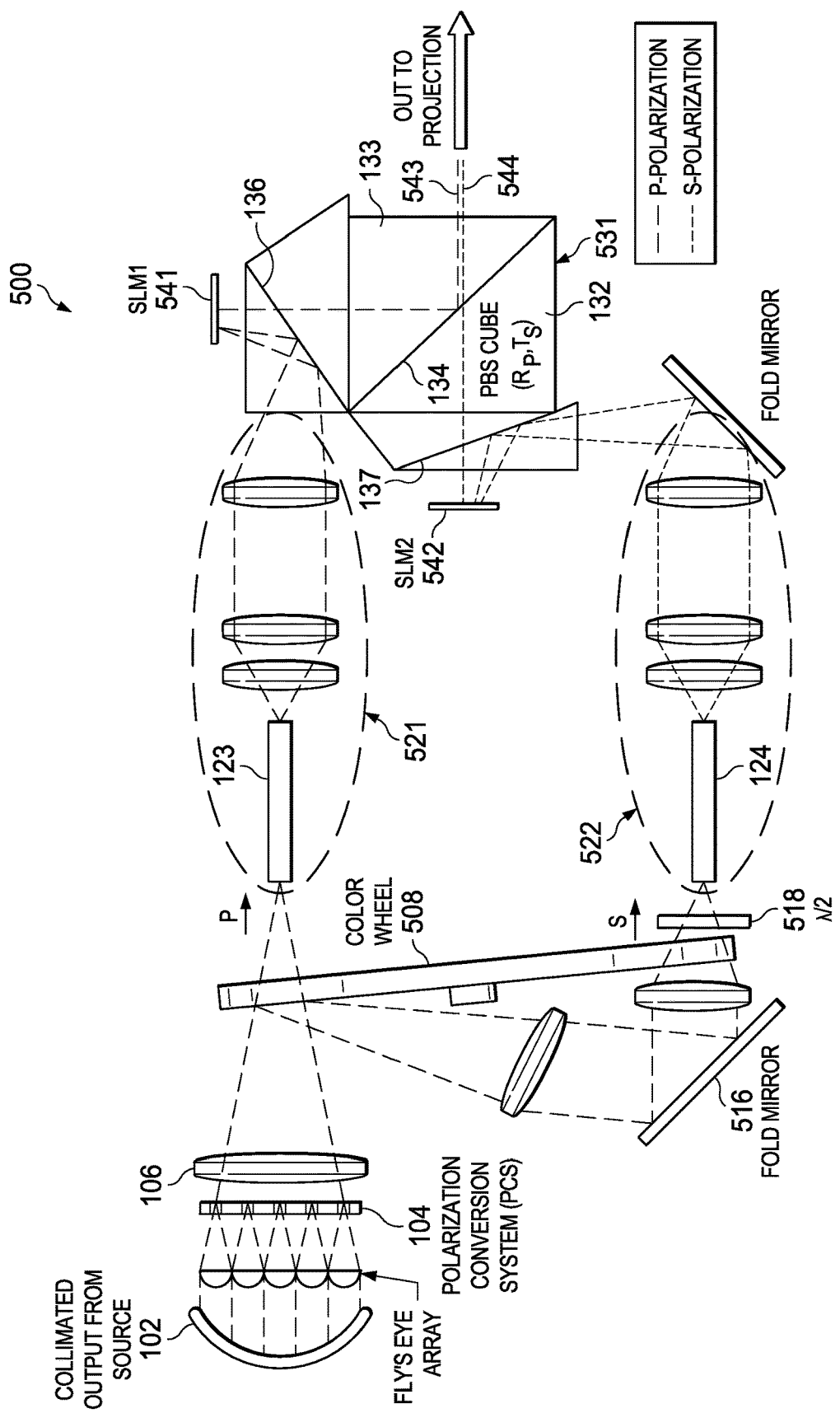

FIG. 5 illustrates an example projector 500 that uses a single tilted color wheel 508. In this example, a beam splitter in front of the color wheel is not needed. Instead, by tilting the color wheel, the reflected light from tilted color wheel 508 may be transmitted directly to fold mirror 516. In this example, there are no wave plates in the first light path 521; therefore the p polarization light beam is provided to spatial light modulator 541 and s polarized light is provided to spatial light modulator 542. In this case, PBS cube 531 is configured to pass s polarized light as indicated at 544 and to reflect p polarized light as indicated at 543. In this example, wave plate 518 is configured as a half wave plate.

Figure 6:
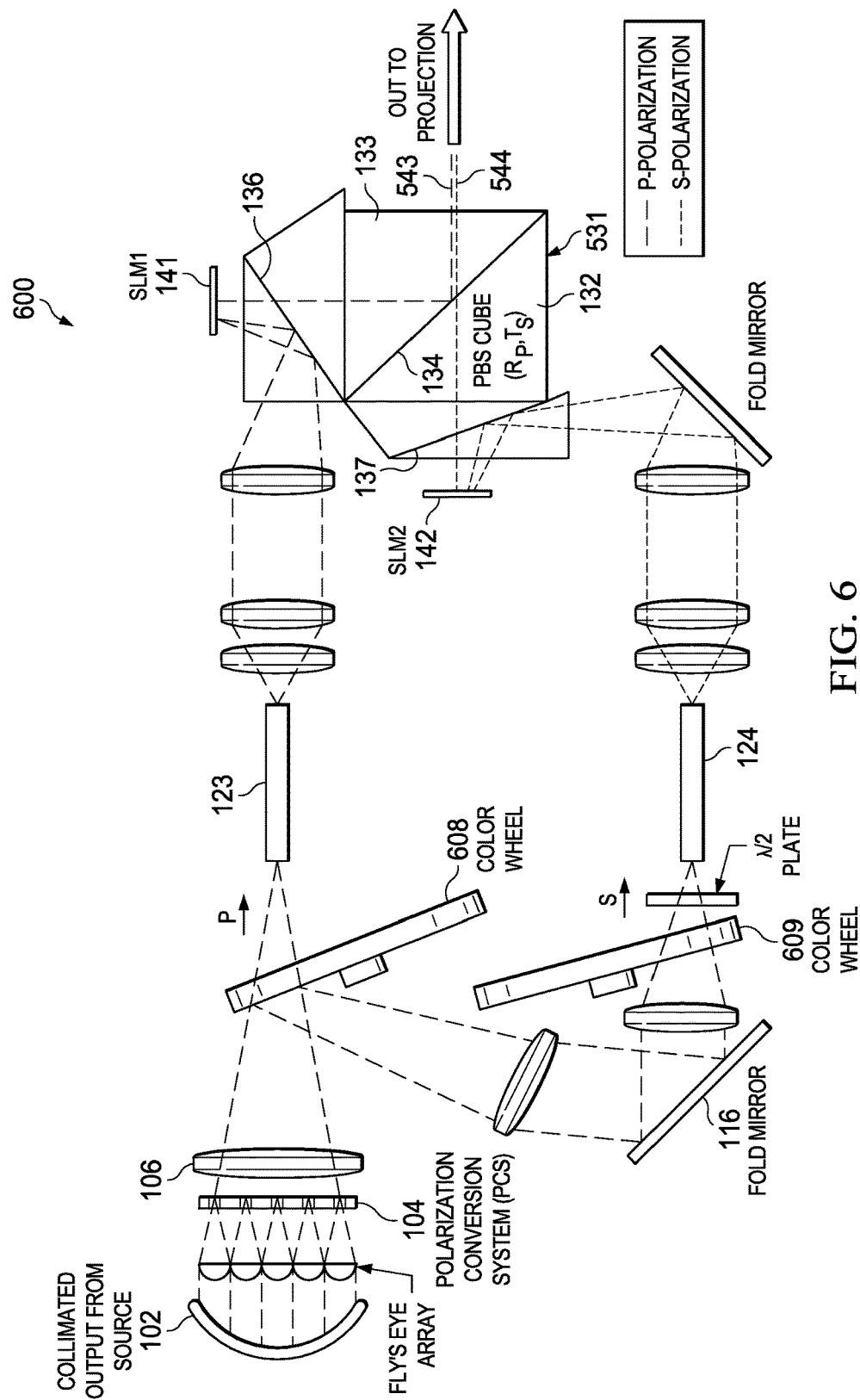

FIG. 6 illustrates an example projector 600 that uses two tilted color wheels 608, 609. Its operation is similar to projector 500.

Figure 7:
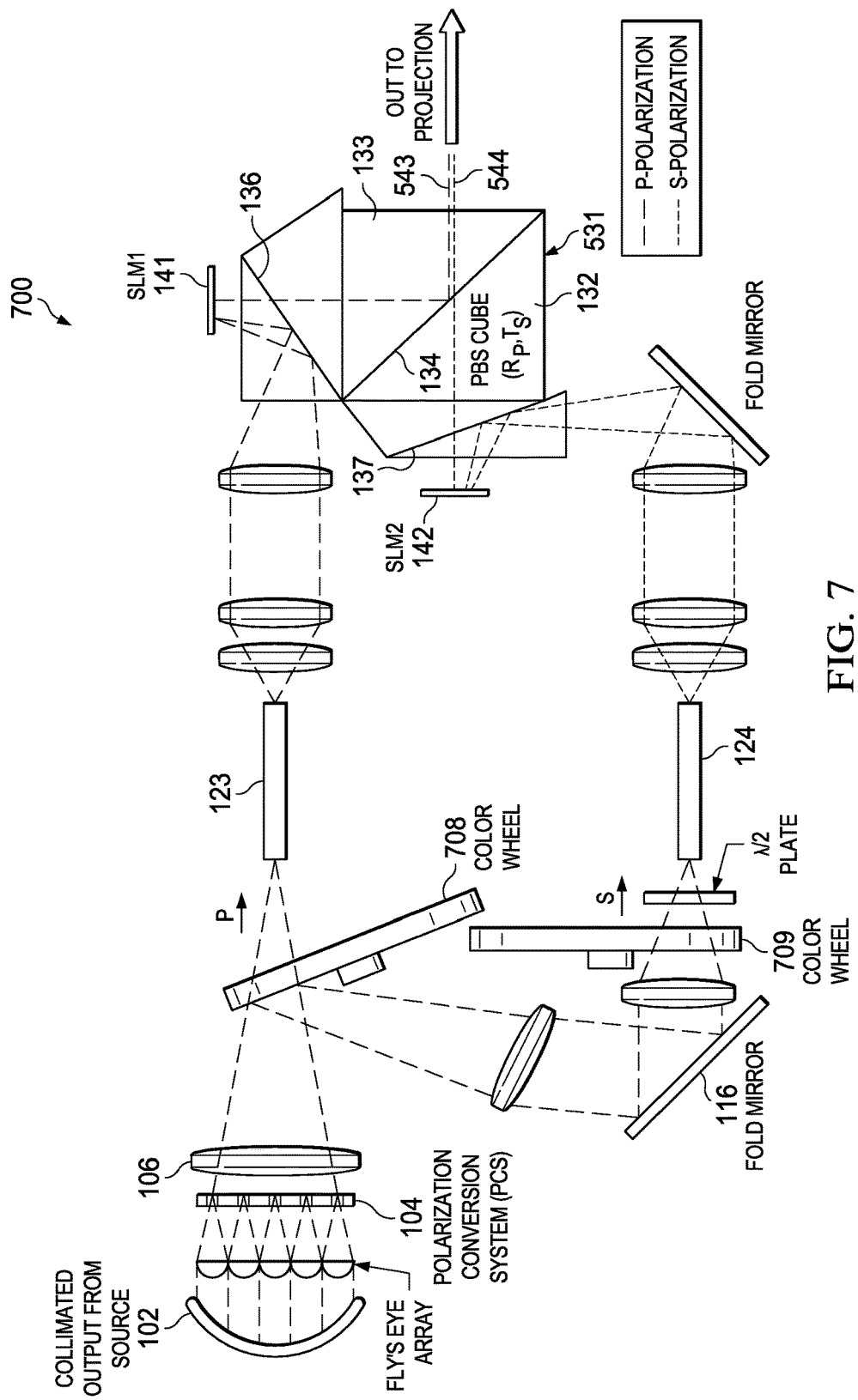

FIG. 7 illustrates an example projector 700 that uses two color wheels 708, 709. Color wheel 708 is tilted as described with regard to FIG. 5, while color wheel 709 is oriented normal to the color path. Its operation is similar to projector 500.

Figure 8:
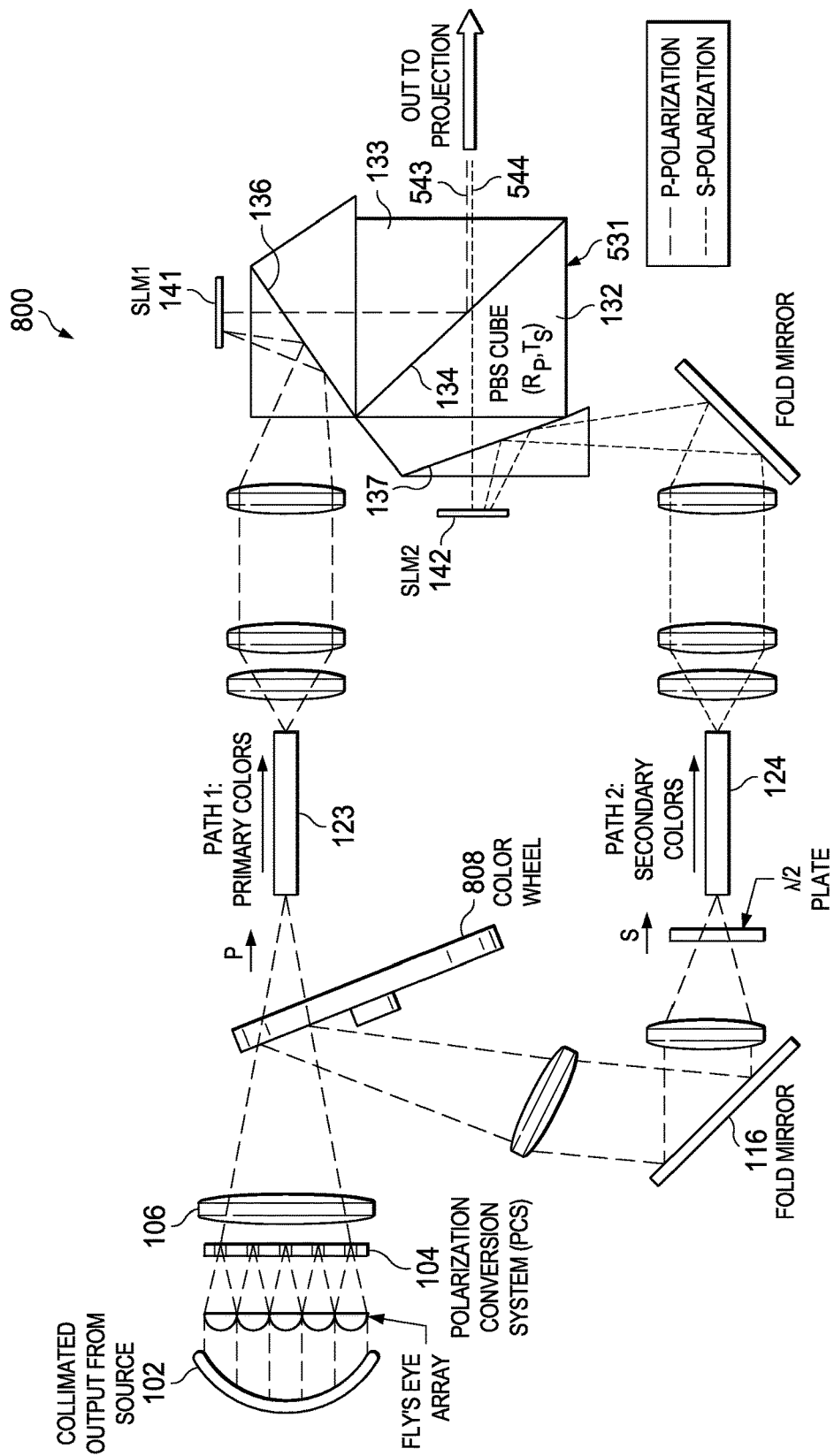

FIG. 8 illustrates an example projector 800 that uses one tilted color wheel 808. Its operation is similar to projector 500. In this example, path 2 does not have a color wheel to filter the light reflected from color wheel 808.

Figure 9:
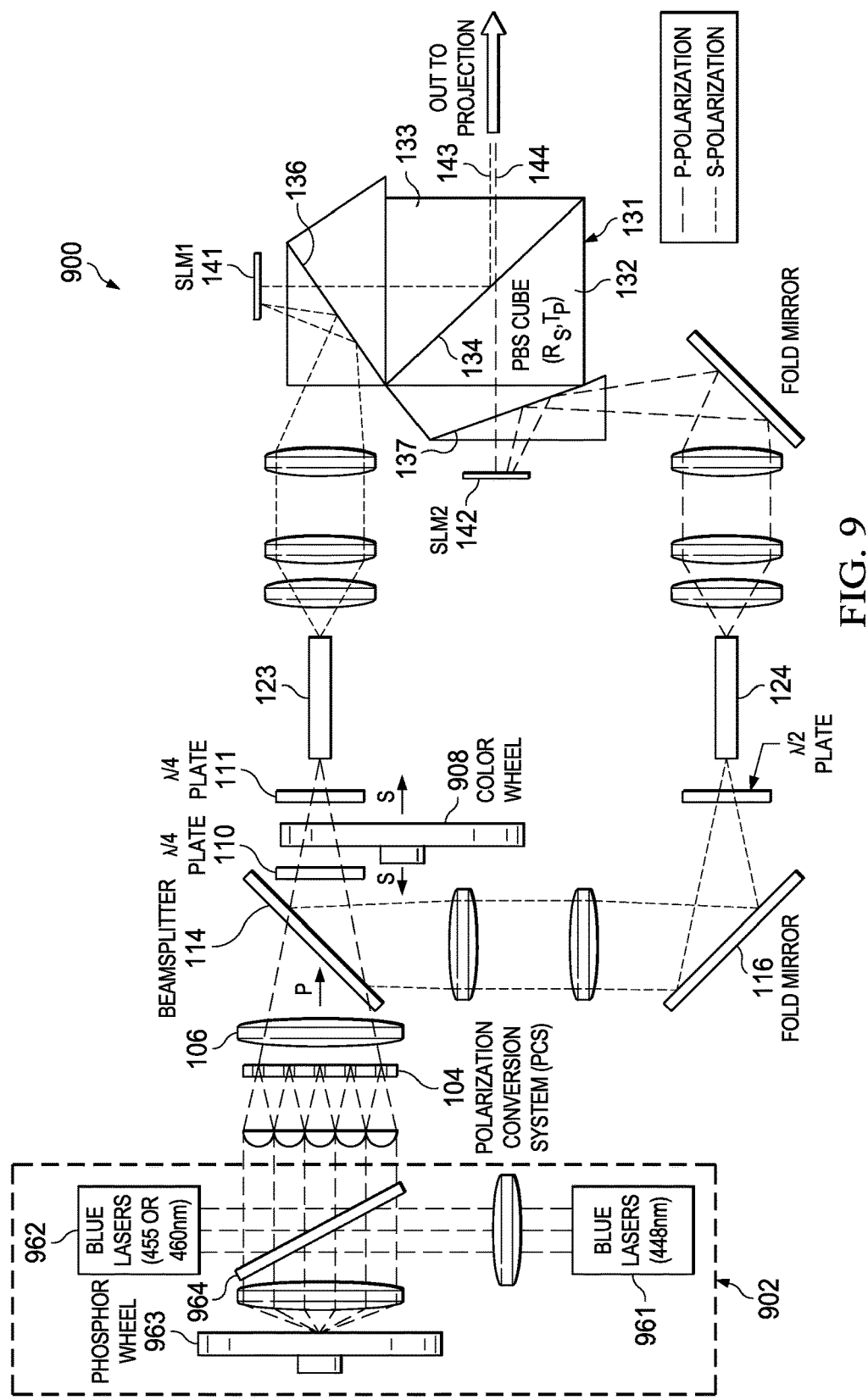
FIG. 9 illustrates use of a blue laser and phosphor light source for any of the light paths illustrated in FIGS. 1 and 3-8.

FIG. 9 illustrates an example projector 900 that uses a blue laser light source 902. While this example illustrates a projector 900 that is similar to projector 400, laser light source 902 may be used for any of the light paths illustrated in FIGS. 1 and 3-8, for example. Laser phosphor light sources are now well known and need not be described in detail herein. In this example, blue laser array 961 produces a blue light beam that is directed onto phosphor wheel 963 be reflector 964. In various embodiments, phosphor wheel 963 may be all yellow, all green, or have various segments for yellow, green, red, etc. Since there is currently not a phosphor available that produces blue light, blue laser bank 962 may be used to produce blue light, for example. Currently, phosphor wheels are used in order to disperse heat buildup on the phosphor surface. In some embodiments, the need for a phosphor wheel may be eliminated by other means of cooling the phosphor, such as liquid cooling, for example. Depending on the configuration of phosphor wheel 963, color wheel may be designed accordingly and may be rotated in synchronization with phosphor wheel 963 in some embodiments.

Figure 10:
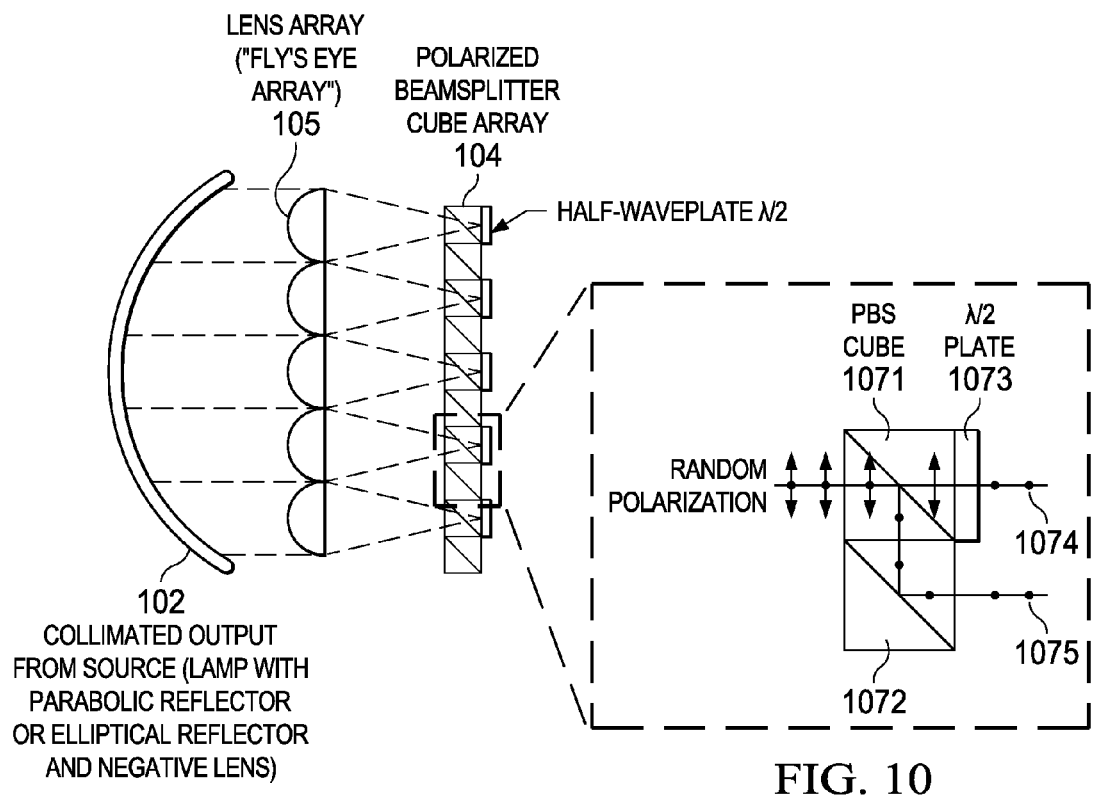
FIG. 10 is a more detailed view of a polarization conversion system for use in any of the light paths illustrated in FIGS. 1 and 3-8.

FIG. 10 is a more detailed view of a polarization conversion system 104 for use in any of the light paths illustrated in FIGS. 1 and 3-8. As described earlier, light source 102 provides a collimated light. Light source 102 may be an arc lamp or other source of white light. A parabolic or elliptical reflector in combination with a negative lens may be used to focus and direct the light onto fly's eye lens array 105. Each fly's eye lens in turn focuses a portion of the light beam from source 102 onto individual PBS cubes in PBS cube array 104. Looking closer at one set of PBS cubes 1071, 1072, light entering PBS cube 1071 travels straight through if it has s polarization and is then rotated 180° by half wave plate 1073 and emerges as p polarized light 1074. At the same time, p polarized light entering PBS cube 1071 is reflected downward into PBS cube 1072. This light is then reflected again by PBS cube 1072 and emerges as p polarized light 1075. In this manner, the light received from light source 102 may be converted into a beam of p polarized light.

Figure 11:
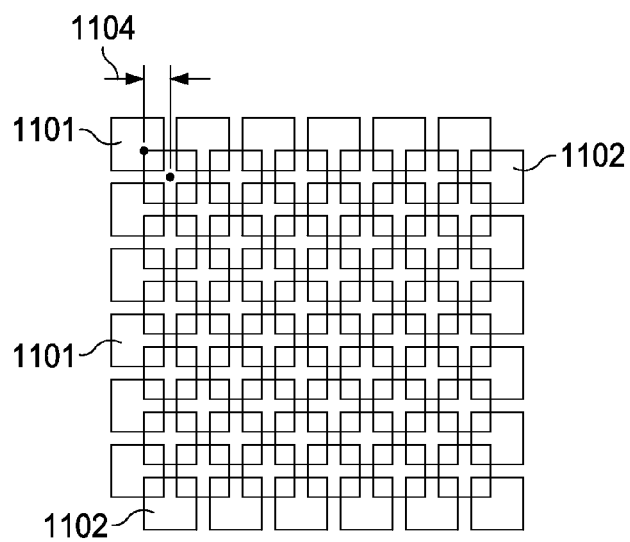
FIG. 11 illustrates an offset technique for producing images at a perceived resolution higher than the resolution of the spatial light modulator.

FIG. 11 illustrates an offset technique for producing images at a perceived resolution higher than the resolution of the spatial light modulator. In this figure, pixel array 1101 and pixel array 1102 are merely representative of a much larger pixel array. Using a processing system that supports multiple color channels or other algorithms supporting the combination of more than three color channels and gamut mapping, two sets of images 1101, 1102 formed by different spatial light modulators may be superimposed on the screen with a slight offset as illustrated at 1104. Each set of images may be formed by all 6 multi-primary colors. Specifically, one set of images formed by one of the two spatial light modulators may be composed of red, green, blue colors; and the reflected cyan, magenta, and yellow colors. The other set of images formed by the other spatial light modulator may be composed of the reflected cyan, magenta, and yellow colors, and the transmitted red, green, blue colors. This arises from the fact that both spatial light modulators see all six colors. By offsetting the two sets of images formed by the two spatial light modulators a predetermined distance 1104, such as half the pitch size of a pixel, an image with a higher resolution can be achieved, wherein the pitch size is defined as the center-to-center distance between adjacent pixels of the pixel array of the spatial light modulator. Of course, the offset of the two superimposed images can be of any other values, such as half the diagonal of the pixel size, or other desired values.

Spatial Light Modulator

Referring again to FIGS. 1, 3-8, the spatial light modulators in any of the projectors illustrated therein may be implemented using an optical semiconductor known as the DLP® chip (digital light processing chip), which was invented by Dr. Larry Hornbeck of Texas Instruments in 1987. A DLP chips may also be referred to as a "digital micromirror device" (DMD). The DLP chip is perhaps the world's most sophisticated light switch. Currently, a typical DLP chip contains a rectangular array of up to 8 million hinge-mounted microscopic mirrors; each of these micromirrors measures less than one-fifth the width of a human hair. When a DLP chip is coordinated with a digital video or graphic signal, a light source, and a projection lens, its mirrors can reflect a digital image onto any surface.

A DLP chip's micromirrors tilt either toward the light source in a DLP projection system (ON) or away from it (OFF). This creates a light or dark pixel on the projection surface. The bit-streamed image code entering the DLP semiconductor directs each mirror to switch on and off up to ten thousand times per second. When a mirror is switched on more frequently than off, it reflects a light gray pixel; a mirror that's switched off more frequently reflects a darker gray pixel. In this way, the mirrors in a DLP projection system can reflect pixels in up to 1,024 shades of gray to convert the video or graphic signal entering the DLP chip into a highly detailed grayscale image.

The white light generated by the light source in a DLP projection display system may pass through a color filter as it travels to the surface of the DLP chip. This filters the light into a minimum of red, green, and blue, from which a single-chip DLP projection system can create at least 16.7 million colors. Many DLP projection display systems offer solid-state illumination which replaces the traditional white lamp. As a result, the light source emits the necessary colors eliminating the color filter. In the DLP systems described herein, a two-chip architecture is used, particularly for high brightness projectors required for large venue applications such as concerts and movie theaters.

In other embodiments, the spatial light modulator may be implemented using a transmissive light valve, such as a liquid crystal display (LCD) or liquid crystal on silicon (LCoS) display, for example.

System Example

Figure 12:
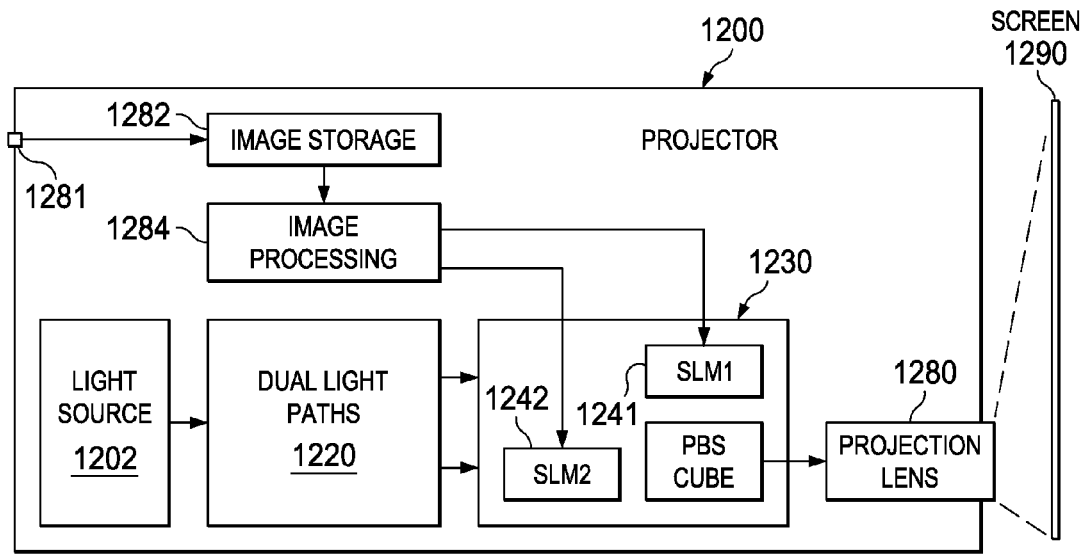
FIG. 12 is a block diagram of a projector that may use two paths of differently polarized light as illustrated in FIGS. 1 and 3-8.

FIG. 12 is a block diagram of a projector 1200 that may use two paths of differently polarized light such as illustrated in FIGS. 1 and 3-8 in order to project an image onto a surface 1290. Surface 1290 may be an optically reflective screen or an optically conductive screen in which the image may be observed from a side opposite the projector, for example.

Projector 1200 may include a light source 1202, dual light path 1220, and projection optics 1230 as described above in more detail with regard to FIGS. 1-11. Projection lens 1280 receives the combined image beam from projections optics 1230 and project the image onto surface 1290 using known lens techniques.

Projector 1200 may include image storage logic 1282 for storing a video or image data for projection. Video and image data may be received via in interface 1281 from an external source. Interface 1281 may be a wired or wireless connection, such as Ethernet, WiFi, cellular or other known or later developed communication technologies. Interface 1281 may alternatively interface with a physical media, such as a compact disc (CD), digital video disc (DVD), etc.

Image processing logic 1284 may be configured to decode a compressed video stream, such as MPEG or JPEG images using known or later developed techniques. Image processing logic 1284 is configured to produce two streams of image data that are provided to spatial light modulators 1241, 1242 in order to produce modulated light beam that is provided to projection lens 1280. Image processing logic 1284 may be implemented using DLP LightCrafter™ hardware and software available from Texas Instruments Incorporated, for example.

Figure 13:
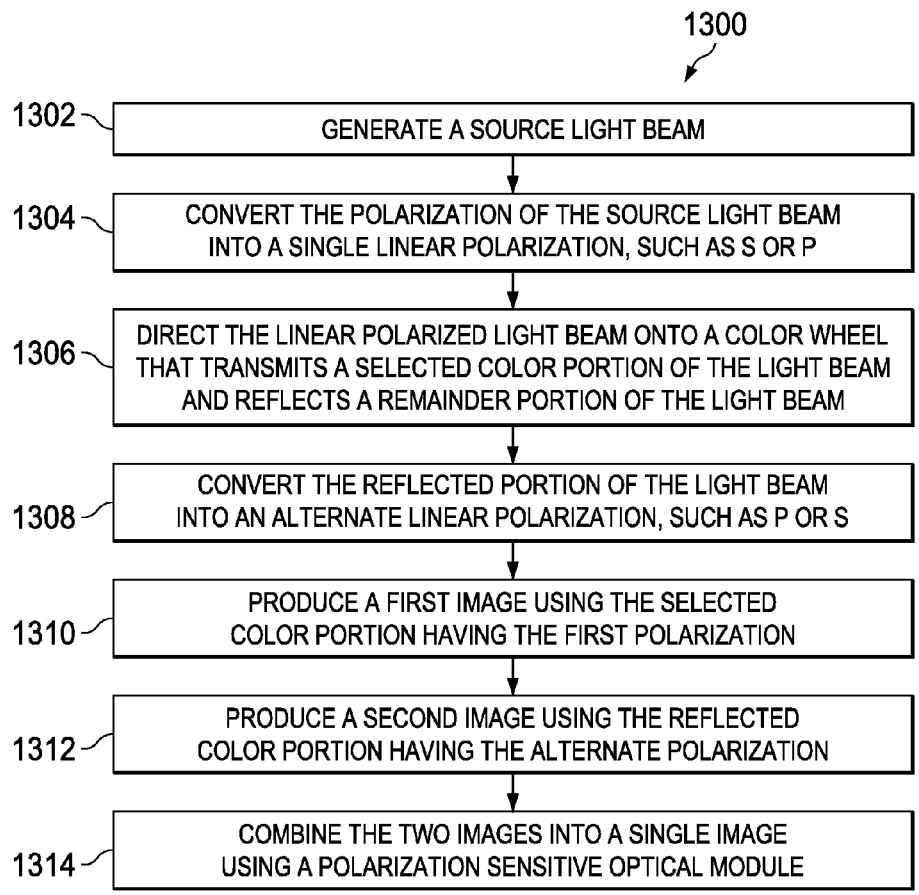
FIG. 13 is a flow chart illustrating formation of an image using recovered light.

FIG. 13 is a flow chart illustrating formation of an image using recovered light as described in more detail with regard to FIGS. 1-12. A light source, such as light source 102 or laser/phosphor light source 902, generates 1302 a light beam having random polarization.

The light beam is converted 1304 into a light beam having a uniform linear polarization, such as s polarization or p polarization. A polarization conversion system 104 such as illustrated in FIG. 10 may be used to perform this conversion.

The uniformly polarized beam of light is then directed 1306 onto a color wheel that transmits a first selected color portion of the light beam and reflects a second color portion of the light beam. An example of a color wheel is provided in FIG. 2.

The reflected portion of the source light is captured and converted 1308 into an alternate linear polarization. For example, if the selected color portion has a p polarization, the reflected portion is converted 1308 to s polarization, or vice versa. Two quarter wave plates in series, such as wave plates 118, 119, or one half wave plate, such as 418, may be used for this conversion.

A first portion of the image is produced 1310 with a first spatial light modulator using the first selected color portion of the light beam having the first polarization. The spatial light modulator may be a DMD device, for example. Alternatively, the spatial light modulator may be an LCD or other form of display device.

A second portion of the image is produced 1312 with a second spatial light modulator using at least a portion of the reflected second color portion of the light beam having the second polarization.

The first portion of the image and the second portion of the image are combined 1314 to form a combined image for projection.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein. For example, a third DMD may be added to provide a contrast boost and thereby increase the dynamic range of an image system.

Embodiments of a display system as disclosed herein allow the display system to recapture a significant amount of the light (all wavelengths) from the lamp source. Transmission and any possible geometric losses are independent of this disclosure, and may contribute to the overall system efficiency.

Embodiments of this disclosure are not specific to only lamp light sources but may be applied to a solid-state light source as well.

As described above, some implementations may utilize a tilted color wheel. In this case, some components are no longer required, such as the beamsplitter and quarter-waveplate; only a single half-waveplate is needed. Similarly a single large color wheel, or two color wheels, or only a single color wheel in the 1$^{st}$ path may be used in different architectural options for this color recapture concept.

It is therefore contemplated that the appended claims will cover any such modifications of the embodiments as fall within the true scope of the invention.

What is claimed is:

1. A method of producing an image, the method comprising:

forming a light beam;

directing the light beam through a polarization rotator onto a rotating color wheel having at least first, second, third and fourth segments that reflect a portion of the light beam back through the polarization rotator and that transmit a portion of the light beam through the rotating color wheel, wherein the transmitted portion has: a first color when the light beam is directed onto the first segment; a second color when the light beam is directed onto the second segment; a third color when the light beam is directed onto the third segment; and a fourth color when the light beam is directed onto the fourth segment; wherein the first, second and third colors are different primary colors from among red, green and blue; and wherein the fourth color is a secondary color from among cyan, magenta and yellow;

converting a polarization of the transmitted portion and/or the reflected portion from the first, second, third and fourth segments, so: the transmitted portion has a first polarization; and the reflected portion has a second polarization that is opposite the first polarization;

conducting the transmitted portion having the first polarization through a first optical path to a first spatial light modulator, and producing a first portion of the image with the first spatial light modulator;

conducting at least some of the reflected portion having the second polarization through a second optical path to a second spatial light modulator, and producing a second portion of the image with the second spatial light modulator, wherein the second optical path is separate and distinct from the first optical path; and combining the first portion of the image and the second portion of the image to form a combined image for projection.

2. The method of claim 1, wherein the color wheel is a first color wheel, the method further comprising:

directing the reflected portion onto a second color wheel that transmits only a particular color portion of the reflected portion;

wherein producing the second portion of the image with the second spatial light modulator uses the particular color portion.

3. The method of claim 1, further comprising:

directing the reflected portion onto a particular segment of the color wheel that transmits only a particular color portion of the reflected portion;

wherein producing the second portion of the image with the second spatial light modulator uses the particular color portion.

4. The method of claim 1, wherein combining the first portion of the image and the second portion of the image includes:

directing the first portion of the image to a first face of a polarizing beam splitter (PBS) cube, and directing the second portion of the image to a second face of the PBS cube, such that the combined image emerges from a third face of the PBS cube.

5. The method of claim 1, wherein the color wheel is a first color wheel, the method further comprising:

filtering the reflected portion by directing the reflected portion onto a second color wheel that transmits only a particular color portion of the reflected portion;

wherein producing the second portion of the image with the second spatial light modulator uses the particular color portion.

6. The method of claim 1, wherein the color wheel is tilted with respect to an axis of the light beam, such that the reflected portion is directed towards the second optical path.

7. The method of claim 1, wherein an axis of the color wheel is oriented approximately parallel to an axis of the light beam, such that the reflected portion is directed along the axis of the light beam, the method further comprising:
passing the light beam through a beam splitter, and deflecting the reflected portion by the beam splitter towards the second optical path.

8. The method of claim 1, wherein combining the first portion of the image and the second portion of the image includes:
combining the first portion of the image and the second portion of the image to form the combined image having a higher resolution than the first portion of the image by offsetting the second portion of the image with respect to the first portion of the image.

9. The method of claim 1, wherein forming the light beam includes: forming the light beam using a laser source combined with a phosphor wheel.

10. The method of claim 1, wherein the first spatial light modulator and the second spatial light modulator are digital micromirror devices.

11. The method of claim 1, wherein the polarization rotator is a quarter-wave plate.

12. A projector device comprising:
image processing logic coupled to control: a first spatial light modulator (SLM) to produce a first portion of an image; and a second SLM to produce a second portion of the image;
a light source to produce a light beam;
a first polarization rotator;
a rotating color wheel;
a lens arranged to direct the light beam through the first polarization rotator onto the rotating color wheel, the rotating color wheel having at least first, second, third and fourth segments to reflect a portion of the light beam back through the first polarization rotator and to transmit a portion of the light beam through the rotating color wheel, wherein the transmitted portion has: a first color when the light beam is directed onto the first segment; a second color when the light beam is directed onto the second segment; a third color when the light beam is directed onto the third segment; and a fourth color when the light beam is directed onto the fourth segment; wherein the first, second and third colors are different primary colors from among red, green and blue; and wherein the fourth color is a secondary color from among cyan, magenta and yellow;
a second polarization rotator arranged to convert a polarization of the transmitted portion and/or the reflected portion from the first, second, third and fourth segments, so: the transmitted portion has a first polarization; and the reflected portion has a second polarization that is opposite the first polarization;
a first optical path arranged to conduct the transmitted portion having the first polarization to the first SLM;
a second optical path arranged to conduct at least some of the reflected portion having the second polarization to the second SLM, wherein the second optical path is separate and distinct from the first optical path; and
projection optics, coupled to the first SLM and to the second SLM, arranged to combine the first portion of the image produced by the first SLM with the second portion of the image produced by the second SLM into a combined image for projection.

13. The device of claim 12, wherein the color wheel is a first color wheel, the device further comprising: a second color wheel arranged to receive the reflected portion and to transmit only a particular color portion of the reflected portion, and wherein the second SLM is arranged to produce the second portion of the image using the particular color portion.

14. The device of claim 12, wherein a particular segment of the color wheel is arranged to receive the reflected portion and to transmit only a particular color portion of the reflected portion, and wherein the second SLM is arranged to produce the second portion of the image using the particular color portion.

15. The device of claim 12, wherein the projection optics include a polarizing beam splitter (PBS) cube coupled to receive the first portion of the image on a first face of the PBS cube and coupled to receive the second portion of the image on a second face of the PBS cube, such that the combined image emerges from a third face of the PBS cube.

16. The device of claim 12, wherein the color wheel is tilted with respect to an axis of the light beam, such that the reflected portion is directed towards the second optical path.

17. The device of claim 12, wherein an axis of the color wheel is oriented approximately parallel to an axis of the light beam, such that the reflected portion is directed along the axis of the light beam, the device further comprising a beam splitter arranged to receive the light beam and to deflect the reflected portion towards the second optical path.

18. The device of claim 12, wherein the projection optics are arranged to combine the first portion of the image produced by the first SLM with the second portion of the image produced by the second SLM into the combined image having a higher resolution than the first portion of the image by offsetting the second portion of the image with respect to the first portion of the image.

19. The device of claim 12, wherein the light source is a laser source combined with a phosphor wheel.

20. The device of claim 12, wherein the first SLM and the second SLM are digital micromirror devices.

21. The method of claim 1, wherein forming the light beam comprises: forming a polarized light beam.

22. The device of claim 12, wherein the light beam is a polarized light beam.

23. The device of claim 12, wherein the color wheel is a first color wheel, the device further comprising: a second color wheel arranged to filter the reflected portion by transmitting only a particular color portion of the reflected portion, wherein the second SLM is arranged to produce the second portion of the image using the particular color portion.

24. The device of claim 12, wherein the first polarization rotator is a quarter-wave plate.

* * * * *